(12) United States Patent
Cai

(10) Patent No.: US 6,840,158 B2
(45) Date of Patent: Jan. 11, 2005

(54) DEVICE FOR MAKING COFFEE DRINK HAVING A CREMA LAYER

(76) Inventor: Edward Z. Cai, 4767 NW. Jeanice Pl., Corvallis, OR (US) 97330

(*) Notice: Subject to any disclaimer, the term of this patent is extended or adjusted under 35 U.S.C. 154(b) by 0 days.

(21) Appl. No.: 10/315,972

(22) Filed: Dec. 9, 2002

(65) Prior Publication Data

US 2004/0107841 A1 Jun. 10, 2004

(51) Int. Cl.[7] ................................. A47J 31/00
(52) U.S. Cl. .................... 99/323.1; 99/302 R; 99/293
(58) Field of Search ..................... 99/323.1, 302 R, 99/302 P, 293

(56) References Cited

U.S. PATENT DOCUMENTS

| | | |
|---|---|---|
| 4,882,982 A | 11/1989 | Muttoni |
| 5,127,318 A | 7/1992 | Selby |
| 5,150,645 A | 9/1992 | Schiettecatte |
| 5,207,149 A | 5/1993 | Weber |
| 5,473,973 A | 12/1995 | Cortese |
| 5,615,602 A | 4/1997 | Schmēd |
| 5,638,740 A | 6/1997 | Cai |
| 5,870,943 A * | 2/1999 | Levi et al. ............. 99/287 |
| 6,119,582 A | 9/2000 | Akkerman-Theanisse et al. |
| 6,412,394 B2 * | 7/2002 | Bonanno ............... 99/299 |

FOREIGN PATENT DOCUMENTS

| | | |
|---|---|---|
| EP | 0682902 | 1/1999 |
| EP | 1092377 | 4/2000 |

* cited by examiner

Primary Examiner—Reginald L. Alexander

(57) ABSTRACT

Device for preparing a coffee drink having a visually appealing crema layer comprises a container for receiving flavor-containing materials and allowing it to interact with pressurized hot water to produce a coffee drink, an orifice for converting the coffee drink into a high speed drink jet, and a cyclone channel located below the orifice and adapted to interact with the jet to generate a cyclone zone therein during preparing the coffee drink. The cyclone zone stays alive by constantly drawing air in from atmosphere to emulsify with the coffee drink within the cyclone zone and constantly driving the resulting emulsion out of the cyclone zone as a result of the momentum of the jet. The emulsion separates into a coffee drink layer and a crema layer on top of the coffee drink upon being received in a cup.

23 Claims, 2 Drawing Sheets

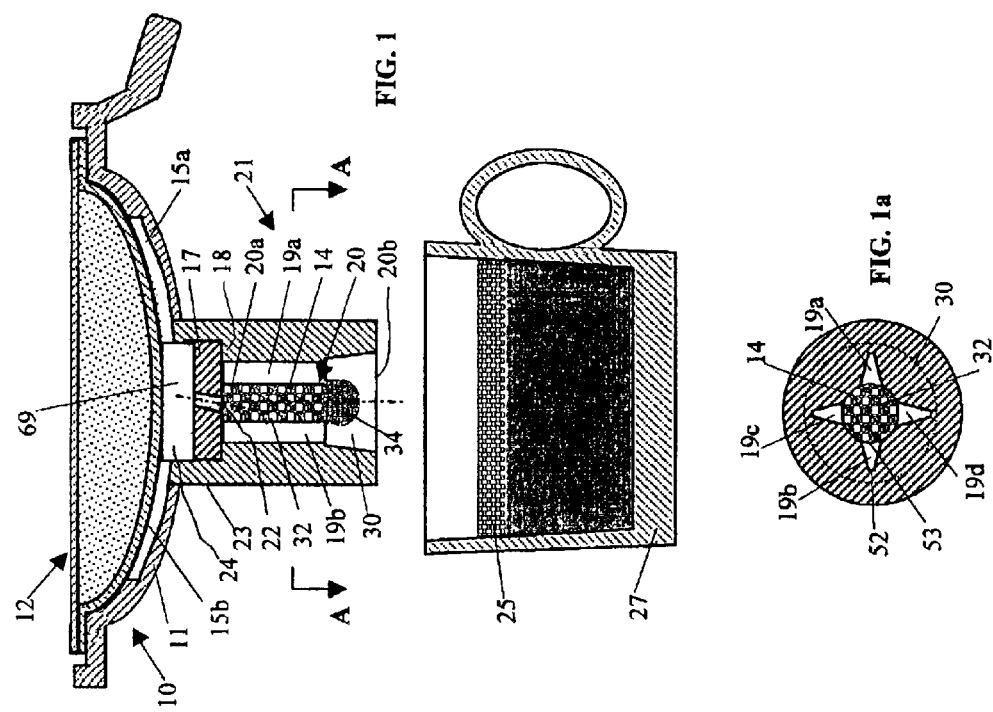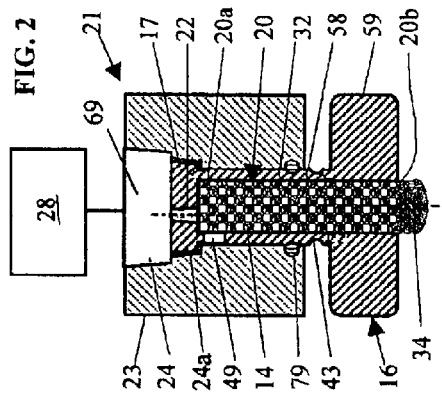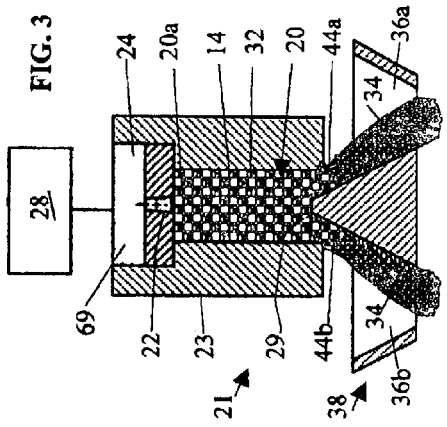

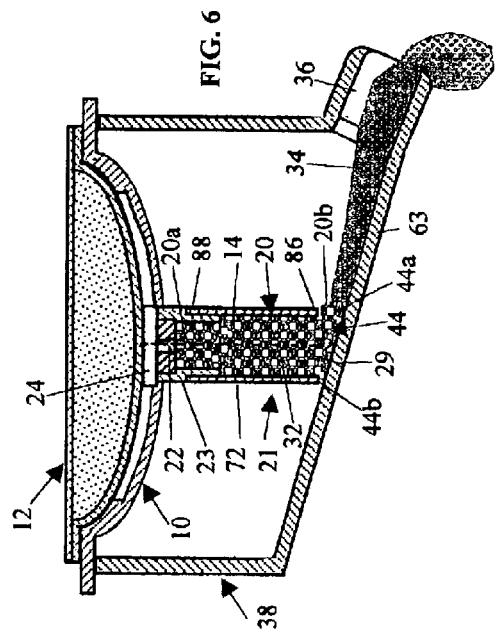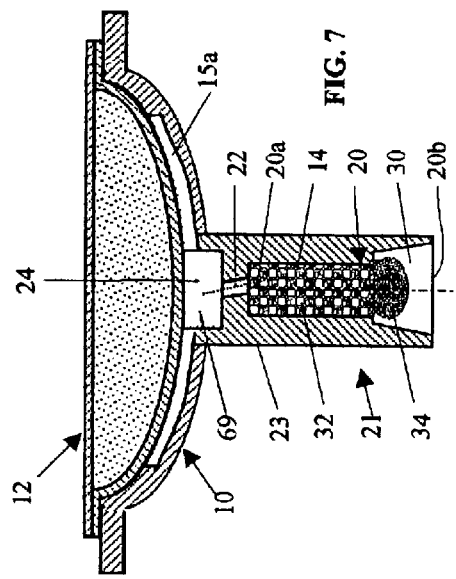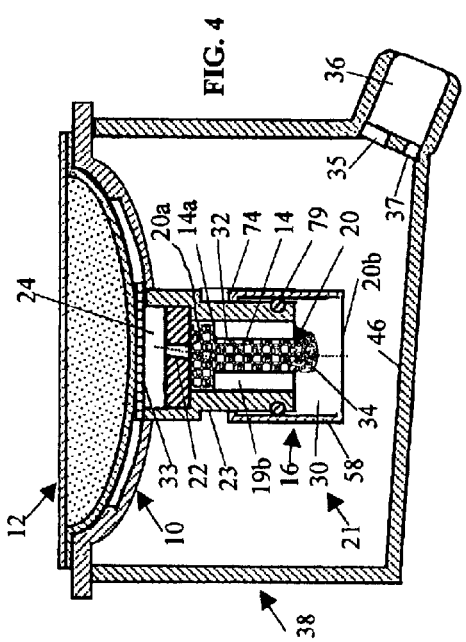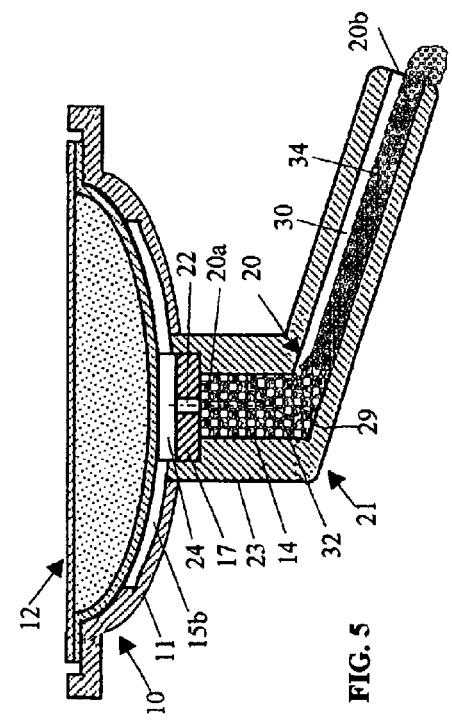

DEVICE FOR MAKING COFFEE DRINK HAVING A CREMA LAYER

FIELD OF THE INVENTION

The invention relates to a device for making coffee drinks such as coffee, espresso, cappuccino, latte, hot chocolate and mocha having a visually appealing crema layer.

BACKGROUND OF THE INVENTION

A crema layer, i.e. a small-bubbled foam layer, on top of coffee is a sign of a perfect cup of coffee. Such crema layer may be obtained with a high-pressure pump espresso machine only if the right grind size and right degree of tamping of the coffee are used. To make it easier to achieve the crema layer, Muttoni in U.S. Pat. No. 4,882,982, Selby in U.S. Pat. No. 5,127,318, Schiettecatte in U.S. Pat. No. 5,150,645 and Custio in EP 0682902B1 taught improved filter holders to increase the back pressure in the holder, therefore reducing the dependence of the crema layer on the grind size and degree of tamping. Unfortunately, these improved holders cause unacceptable amount of residual water above the coffee grounds, are difficult to clean and vulnerable to clogging, require very high pressure, and are complex and expensive to manufacture.

The improved holders taught by the applicant in U.S. Pat. No. 5,638,740, Akkerman-Theunisse et al. in U.S. Pat. No. 6,119,582, Brouwer in EP 1092377, and Sara Lee/DE and Philips in Senseo® coffeemakers resolved some of the above problems. These improved holders generate crema by converting coffee into a high-speed jet, forming a bath or reservoir of coffee in a container below the jet, and injecting the jet to the coffee surface in the bath or reservoir. Such improved holder, however, also has numerous drawbacks. First, it slows down the brewing process since it requires additional time to form the coffee bath in a container at the beginning of brewing and to drain the coffee bath at the end of brewing. Second, the cleaning of such improved holder is tedious since consumers have to clean both the container needed for forming the bath and the filter basket. Third, such improved holder makes all coffee drinks with the same thick crema layer, which dissatisfies those people who prefer a cup of plain coffee without a crema layer. Forth, such improved holder is still too complex and expensive for a low cost espresso machine or coffeemaker that is affordable by average consumers.

It is an object of the invention to provide a device for making crema that does not require a special container for forming a bath of coffee for the formation of crema.

It is an object of the invention to provide a device for making crema that has fewer loose parts that are in contact with coffee during brewing, therefore being easier to clean.

It is a still further object of the invention to provide a device that gives consumers a choice to make a cup of coffee drinks with or without a crema layer.

It is a still further object of the invention to provide a device for making crema that is simple and very inexpensive.

It is a still further object of the invention to provide a device for making crema that does not require additional time to build and drain a coffee bath.

It is a still further object of the invention to provide a device for making crema that does not require high pressure.

It is a still further object of the invention to provide a device for making crema that will not cause residual water above the coffee grounds.

It is a still further object of the invention to provide a device for making crema that is inexpensive enough to be disposable when it is used as part of a disposable coffee cartridge or pod.

Still other objects will become apparent after reading the accompanying drawings and description. It should be understood that the invention could still be practiced without performing one or more of the objects set forth above.

SUMMARY OF THE INVENTION

Accordingly, the invention provides a device for making coffee drinks or the like having a visually appealing crema layer. The device comprises a container for receiving flavor-containing materials and allowing it to interact with pressurized hot water to produce coffee drink, an orifice for converting the coffee drink into a high speed drink jet, and a cyclone channel located below the orifice and adapted to interact with the jet to generate a cyclone zone during preparing the drink. The cyclone zone stays alive by constantly drawing air in from atmosphere to emulsify with the coffee drink within the cyclone zone and constantly driving the resulting emulsion out of the cyclone zone as a result of the momentum of the jet. The emulsion separates into a coffee drink layer and a crema layer on top of the coffee drink upon being received in a cup.

The formation of the cyclone zone in the cyclone channel can be facilitated by tilting the orifice or the cyclone channel, by making orifice or the cyclone channel not coaxial, by providing properly small cross-section and large length for the cyclone channel, by providing protrusion member on the interior surface of the cyclone channel below the orifice and by providing an expanded cyclone channel directly adjacent to the orifice. A reflector and a sufficiently small gap between the reflector and the cyclone channel can also be provided for causing or facilitating the formation of the cyclone zone. The gap is dimensioned to allow air to be drawed into and the emulsion to be driven out of said cyclone zone at optimized rate to maintain the cyclone zone alive during preparing the drink.

At least one satellite channel can be formed along the cyclone channel to facilitate the formation of the cyclone zone by providing communication between the cyclone channel and atmosphere. The satellite channel has an upper end located a predetermined distance above the bottom of said cyclone channel, a lower end in communication with atmosphere and an elongated opening between the ends of the satellite channel to provide communication between the cyclone channel and satellite channel. The satellite channel comprises a hydrophobic surface for preventing coffee drink from filling the satellite channel by capillary force.

A crema modulator is provided for the device to allow a user to make a cup of coffee drink either with or without a crema layer depending on user's preference at the time. The modulator comprises a fluid control member, a handle for a user to move the fluid control member and an engagement member for restricting the movement of the fluid control member after its position is selected. The fluid control member can be moved between a first position, in which it causes crema generation by causing either the coffee drink to inject into the cyclone channel as a high-speed jet or making air properly available to the coffee drink jet, and a second position, in which it prevents crema generation by causing either the coffee drink to enter the cyclone channel via a larger opening or starving the coffee drink jet of air.

DESCRIPTION OF THE DRAWING

The accompanying drawing illustrates diagramatically non-limitative embodiment of the invention, as follows:

FIG. 1 is a cross-section view of a preferred embodiment of the invention for making crema.

FIG. 1a is a cross-section view of the device for making crema of FIG. 1 taken along line A—A;

FIG. 2 is a cross-section view of another preferred embodiment of the invention for making crema;

FIG. 3 is a cross-section view of another preferred embodiment of the invention for making crema;

FIGS. 4–7 is a cross-section view of four other preferred embodiments of the invention for making crema.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a first preferred embodiment for making a crema layer on coffee drinks according to the present invention. The device 21 has a cylindrical body 23 connected to the bottom 11 of a container 10 configured to receive a coffee pod or cartridge 12 having flavor-containing materials such as coffee grounds, milk solids, non-diary creamer, diary creamer, cocoa or any combination of them enclosed by paper filter or by other water permeable film. Device 21 comprises a collection chamber 24 having a drink 69 received from container 10, a disc 17 having an orifice 22 for allowing the coffee to exit the collection chamber as a coffee jet at high speed, a central channel 20 below the orifice, and satellite channels 19a–d formed along and in communication with the central channel (FIG. 1a). The collection chamber 24 communicates with a plurality of collection channels 15a and 15b on the upper surface of the bottom 11 of container 10 for collecting coffee drink from the cartridge 12. The disc 17 is received in the collection chamber 24 and supported by a base 18 of the collection chamber in sealed manner. The orifice 22 is slightly tapered to avoid any trapping of particles inside the orifice.

The central channel 20 has a upper end 20a directly below the orifice 22 for receiving the coffee jet, a cyclone channel 14 below the upper end 20a for generating crema, an grand channel 30 below the cyclone channel, and a lower end 20b for dispensing the coffee and crema generated in cyclone channel 14 into a cup 27. The cyclone channel 14 is adapted to interact with the coffee drink jet from the orifice to generate a cyclone zone 32 in the cyclone channel during the process of preparing the coffee drink. Although the nature of the cyclone zone remains to be understood, it is theorized that the cyclone zone is a well-defined space in which numerous micro-droplets of liquid and/or micro-droplets of air are moving at sufficient speeds and are interacting vigorously with each other and with the surface(s) that defines the space. The micro-droplets may be moving at various directions at a given moment of time. A theory about the formation of the cyclone zone is given during the discussion of the preferred embodiment of FIG. 3. It is appreciated that such theories here and in the other part of the disclosure are intended only for the purpose of providing one possible explanation for the generation of crema by the device, and are not at all intended to limit the invention in any way.

The cyclone zone 32 is capable of drawing air in from atmosphere to emulsify with the coffee drink within the cyclone zone and driving the resulting emulsion out of the cyclone zone as a result of the momentum of the coffee drink jet. The emulsion 34 from lower end of the cyclone zone 32 enters the grand channel 30, which has a significantly large cross section than the cyclone channel to form a slow emulsion stream, and exits lower end 20b of the central channel 20 to be received in a cup 27. In the cup the emulsion 34 separates into a coffee drink layer and a visually appealing crema layer 25 on top of the coffee drink.

The orifice 22 is tilted to facilitate the formation of the cyclone zone 32 in the central channel 14. It was discovered that the degree of tilting is important to the formation of the cyclone zone 32. Both too much and too little tilting of the orifice 22 will negatively impact the formation of the cyclone zone, therefore negatively impacting the generation of crema by device 21. The proper degree of tilting for the orifice 22 was found to vary from one embodiment to another depending on the cross section, shape and length of the cyclone channel 14, the size and shape of the orifice 22, the pressure and flow rate of the coffee drink above the orifice 22 and other factors. In an exemplar embodiment where the device is for use with a coffee maker that can produce a maximum pressure of 2 to 5 bars and deliver about 4 oz of coffee extraction in 20 to 30 seconds, the proper degree of tilting for orifice 22 was found to be approximately 0.5 to 40 degrees, preferably 5 to 15 degrees from the vertical axis of the cyclone channel when the orifice 22 was about 0.04 to 0.1 cm in diameter and the cyclone channel 14 was about 0.1 to 0.4 cm in diameter and about 1 cm in length. However, it was found that a cyclone zone can be formed in certain situations even with either no tilting or large tilting of the orifice when the cyclone channel 14 is sufficiently small and long, when protrusion(s) or reflector (refer to FIGS. 3, 5 and 6) is located in or below the cyclone channel and/or when the pressure and hot water flow rate by the coffeemaker are sufficiently high. It is appreciated that the cyclone zone formation can also be facilitated by tilting the cyclone channel 14 rather than the orifice 22.

To facilitate the formation of the cyclone zone 32, the cyclone channel 14 needs to be sufficiently small in cross-section and has a sufficient length. In an exemplar embodiment where the device is for use with a coffee maker that can produce a maximum pressure of 2 to 5 bars and deliver about 4 oz of coffee extraction in 20 to 30 seconds, it was found that the proper dimensions for the cyclone channel 14 was about 0.08 to 0.6 cm, preferably about 0.12 to 0.3 cm, in diameter and about 0.4 cm or longer in length when the orifice 22 was about 0.4 to 1 mm in diameter and was tilted at about 5 to 15 degrees. For a non-circular, e.g. square or oval, cyclone channel, the corresponding cross-section is about 0.005 to 0.28 $cm^2$, preferably about 0.01 to 0.07 $mm^2$. It was found that when the length of the cyclone channel is increased, its cross-section area could be increased accordingly without affecting the cyclone zone formation. It was observed that when the cyclone channel 14 is large and short enough to cause the coffee jet from orifice 22 to pass through freely without interacting with the inner surface of the cyclone channel, the cyclone zone was normally not formed in the cyclone channel. It was also observed that fine crema could be obtained when the cyclone channel is dimensioned to cause emulsion 34 to substantially fills the cyclone channel 14 at its lower end. It was observed that in certain situations a cyclone zone can be formed with a relatively large and short cyclone channel when protrusion(s) or reflector (refer to FIGS. 3, 5 and 6) is located in or below the cyclone channel and/or when the pressure and water flow rate by the coffee maker is very high. The protrusion(s) can be a restrictive neck or a protruded dot or a ridge formed on the interior surface of the cyclone channel 14.

The satellite channel has a substantially triangle cross section with the open side 53 as its base and a closed top 52 apart from the base 53 (FIG. 1a). Each of the satellite channels 19a–d has an upper end located below the orifice 22, a lower end positioned near the side wall of the grand channel 30 and being substantially open to atmosphere, and an elongated open base 53 along the cyclone channel 14 for communicating the satellite channel with the cyclone channel. In an exemplar embodiment, the satellite channels were about 0.2 to 1 mm wide in the base 53 and about 2 mm deep from the top 52 to base 53. The surface of the satellite channels is preferably hydrophobic. The hydrophobic surface may be achieved by either using a hydrophobic material such as polyolefin, silicone or fluorinated plastics as the construction material for the cylinder 23 or by coating the surface with a hydrophobic layer of materials. It is appreciated that the device can work with any number of satellite channels, including one satellite channel. The satellite channel can be larger in cross section area than the cyclone channel 14 and can adopt other shapes such as being oval, circle or rectangle in cross-section. By altering the cross section area, length and shape of the satellite channel, the amount of crema to be generated can be adjustable to a certain degree.

To make coffee, the user places a coffee pod 12 into the container 10 and mounts it to the coffeemaker. After turning on the coffeemaker hot water is forced through the coffee pod and into collection chamber 24. The coffee extraction is converted into a coffee jet in orifice 22 and the coffee jet at sufficiently high speed. The high speed jet injects into cyclone channel 14 and interacts with the cyclone channel to form a cyclone zone 32. The cyclone zone draws air in via the satellite channels 19a–d to emulsify with the coffee drink within the cyclone zone and drives the resulting emulsion out of the cyclone zone as a result of the momentum of the coffee drink jet. The emulsion 34 from the cyclone zone 32 exits the lower end 20b of the central channel 20 and is received in cup 27, in which the crema separates from coffee and forms a crema layer 25 above the coffee drink.

In this and other preferred embodiments of the invention, the coffee cartridge or pod 12 can be replaced by a filter basket, by a permanent filter attached to container 10 above the collection channels 15a and 15b, or by a disposable filter for receiving loose coffee grounds. The coffee cartridge 12 can also be replaced by a latte pod, a mocha pod, an espresso pod, a hot chocolate pod or other beverage pod that contains appropriate flavor-containing materials for the drink. For the sake of simplicity, in both the description section and the claims section of the disclosure the term coffee drink will be used to represent any drink such as coffee, espresso, mocha, cappuccino, latte, hot chocolate or hot apple cider that can be made by interacting hot water with flavor-containing solids. Also, the term coffee cartridge will be used to represent beverage cartridge or pod throughout this disclosure.

To simplify the device and reduce cost, the disc 17 and cylindrical body 23 of the device 21 can be injection-molded as a single, integral body. Further, the container 10, cylindrical body 23 and disc 17 of the device 21 can be injection-molded or formed as a single, integral body. Due to its very low cost and simplicity, such an integral body can be used for a disposable cartridge assembly. For example, the coffee cartridge 12 can be permanently attached to container 10 of FIG. 1, which container can be formed from a low cost plastic film or sheet or be injection molded. The device 21 can either be formed as a single, intergarl part of the container 10 or be formed separately and later attached to the container. As a result, the whole assembly shown in FIG. 1, including device 21 and container 10 and cartridge 12, is disposable. Since coffee and crema do not contact any part of the coffeemaker, making the assembly of FIG. 1 inexpensive enough to disposable would completely relieve consumers from time-consuming cleaning work after brewing. An impermeable cover sheet or film may be attached to the rim of the container 10 to prevent loss of aroma.

In FIG. 2, device 21 is for use with or in a device 28 that can provide a supply of drink 69, such as coffee, espresso, latte, milk, hot chocolate, mocha, soft drinks, alcoholic drinks or juices, to orifice 22 to allow the formation of a drink jet at the orifice. The device 21 of FIG. 2 is similar to that of FIG. 1 except that it has an orifice 21 that is not coaxial with cyclone channel 14 rather than tilted, that it has no satellite channel 19 and that it has a crema modulator 16 for adjusting the crema quantity to be generated. The non-coaxiality of the orifice and cyclone channel promotes the interaction between the surface of the cyclone channel and the coffee jet, therefore facilitating the formation of cyclone zone 32 in the cyclone channel. It was found that the cyclone zone 32 is capable of drawing air into the cyclone channel from the lower end 20b of the central channel 20 to emulsify with coffee drink therein.

The crema modulator comprises a fluid control member 58, a handle 59 for a user to move the fluid control member, an engagement O-ring 79 located on the interior surface of cylinder 23, and an engagement recess 43 formed near the bottom of the fluid control member 58 adapted to receive O-ring 79 when the fluid control member is pushed up into cylinder 23. Disc 17 is connected to the top end of the fluid control member 58 and has a tapered side wall to seal to the tapered chamber 24a. A side opening 49, which has a larger size than the orifice 22, is formed on vertical wall of the fluid control member. When the fluid control member is in the position shown in FIG. 2, drink 59 enters the cyclone channel 14 of the central channel 20 via the orifice 22 as a drink jet, which interacts with the cyclone channel 14 to form cyclone zone 32. The cyclone zone 32, as discussed in FIG. 1, causes emulsification of the drink and subsequent crema layer formation. When the fluid control member is pushed up until the O-ring 79 is received in the recess 43 (not shown), the disc 17 is pushed up to cause the seal between the disc and the tapered chamber 24a to be broken. This, in turn, causes the drink to enter the cyclone channel 14 via the large side opening 49 at slow speed, and as a result no cyclone zone and no crema will be produced. It is appreciated that the crema modulator 16 also works for the device taught by the applicant in U.S. Pat. No. 5,638,740 and for the Senseo® coffee maker by Philips and Sara Lee.

Crema modulator 16 makes it possible to make different coffee drinks such as latte, cappuccino, mocha and coffee with the same container 10. To make traditional cappuccino that has lots of crema on the drink top, the user places the fluid control member in the position shown in FIG. 2. To make traditional coffee that has no crema layer, the user simply pushes the fluid control member 58 all the way up.

In FIG. 3, device 21 is for use with or in a device 28 that can provide a supply of drink 69 to orifice 22 to allow the formation of a drink jet at the orifice. Device 21 of FIG. 3 is similar to that of FIG. 1 except that it has an orifice 21 coaxial with cyclone channel 14, that it has no satellite channel 19 and that it has a reflector 29 directly below orifice 22 for causing the formation of cyclone zone 32 in the cyclone channel 14. The reflector 29 is formed on the bottom of a holding container 38, which is only partially shown in FIG. 3, for receiving the device 21. The container 38 can be similar to the filter holders in existing espresso machines. A right gap 44a and a left gap 44b are formed between reflector and the bottom end of the cyclone channel. The container also has two dispensing spouts 36a and 36b for discharging the emulsion 34 from the gaps 44a and 44b into two cups. The reflector 29 has a convex reflection surface and is adapted to cooperate with the interior surface of the cyclone channel to produce cyclone zone 32 in the space defined by the reflector and the cyclone channel.

It is appreciated that the reflector 29 can be replaced by tunnel-shaped reflector with the cyclone channel to be positioned near the middle of the tunnel reflector and the dispensing spouts 36a and 36b located at each end of the tunnel reflector. It is also appreciated that the reflector 29 can be replaced by a flat or a sloped reflector as will be discussed more in FIGS. 5 and 6. It is also appreciated that a channel may be formed on the side wall of the cyclone channel 14 for providing additional air to the cyclone zone 32. It is further appreciated that the size of gaps 44a and 44b is critical for the formation of cyclone zone 32 above the reflector and will be discussed in detail in FIG. 6.

It is theorized that upon reaching the convex reflection surface of reflector 29, the drink jet from the orifice 22 is broken into numerous microscopic droplets which are reflected by the convex reflection surface as primary micro-droplets back into the cyclone channel. These primary micro-droplets carries with them air from atmosphere near gaps 44a and 44b and become emulsified during their traveling towards the interior surface of the cyclone channel and during their interactions with the reflector and the cyclone channel. It is appreciated that it remains to be understood whether the cyclone zone needs to have a negative pressure or whether pressure is relevant to the generation of the cyclone zone. Upon reaching the interior surface of the cyclone channel, the primary micro-droplets are reflected downwards as secondary micro-droplets, which are now mostly emulsions due to the vigorous interaction between the various types of micro-droplets and air brought into the cyclone channel by them, towards the reflector and the gaps 44a and 44b. Some of these secondary micro-droplets are reflected back into the cyclone channel as tertiary micro-droplets and some exits through gaps 44a and 44b as emulsion 34 towards the outlet spouts of the container 38. It is theorized that the space defined by the reflector and the cyclone channel, in which vigorous movements of the various types of micro-droplets or emulsions and air take place constantly, forms the cyclone zone. It is also theorized that the cyclone zones for other preferred embodiments are also formed as a result of numerous interactions such as reflections of micro-droplets by the interior surface of the cyclone channel. The theory also explains reasonably well why the tilting of the orifice 22 or the cyclone channel 14, the presence of protrusions in cyclone channel and the use of a smaller and longer cyclone channel facilitate the formation of cyclone zone 32, thus emulsion or crema, in the cyclone channel since they increase the number of reflections achievable before such micro-droplets exits the cyclone channel. The theory also explains why too much tilting sometimes actually inhibits the formation of cyclone zone because large tilting requires too many reflections before the micro-droplets can exit the cyclone channel. Since each reflection means some energy loss, too many reflections would cause the micro-droplets to have too little momentum when reaching the lower end of the cyclone channel to draw in air or to prevent coalescence, therefore extinguishing the cyclone zone.

In FIG. 4, device 21 is connected to container 10 that is placed above a holding container 38. Device 21 of FIG. 4 is similar to that of FIG. 1 except that an expanded cyclone channel 14a is formed below the orifice and it further comprises a filter 33 for protecting orifice 22 and a crema modulator 16 for regulating the crema generation. Container 38 has a dispensing spout 36 with a smaller lower opening 37 for preventing coarse air bubbles from passing through and a larger upper opening 35 for preventing flooding of container.

Like modulator 16 of FIG. 2, this modulator comprises fluid control member 58 that also functions as a handle and an engagement O-ring 79 on cylinder 23 for frictional engagement with the fluid control member. A fringe 74 is formed on top end of the member 58 for preventing it from being pulled out of the cylinder 23. The fluid control member 58 can be moved all the way up on cylinder 23, i.e. in its non-extended state, to make air maximum available to the cyclone zone, therefore generating maximum crema, and can be moved all the way down to be close to the bottom 46 of the container 38, i.e. in its extended state, to make air minimum available to the cyclone zone, therefore generating minimum crema.

The modulator also works when satellite channels are removed, the orifice 22 is vertical and the cyclone channel 14 is made sufficiently large to allow the coffee jet to pass through freely. With such modification, the coffee jet from orifice 22 can inject at high speed into the coffee bath received on bottom 46 of container 38 to generate crema as taught earlier by the applicant in U.S. Pat. No. 5,638,740 and by Sara Lee/DE and Philips in Senseo® coffeemakers, which indicates that the crema modulator 16 also works with those filter holders taught by prior arts.

Device 21 of FIG. 5 is connected to container 10 and comprises orifice 22 for producing high speed coffee drink jet and a central channel below said orifice. The central channel comprises an upper end for receiving the coffee drink jet, a cyclone channel 14 having a reflector 29 directly below orifice 22 for producing cyclone zone 32, and a grand channel 30 having a sloped bottom surface located adjacent to the reflector and adapted to cause the emulsion generated in cyclone zone 32 to flow under gravity along the grand channel, and a lower end for discharging the emulsion into a receptacle for consumption. The grand channel is arranged to be sufficiently sloped and large in cross section to prevent it from being completely filled by the emulsion flowing in it, therefore allowing the presence of a substantially continuous air space throughout the channel. The sloped grand channel also functions as a handle for container 10. A fluid control member 58 can be used to partially close the grand channel to interrupt the substantially continuous air space.

It was discovered that by making reflector 29 substantially horizontal, device 21 could generate fine crema even if cyclone channel 14 is removed. This is surprising and might represent a new mechanism for generating crema. Without the cyclone channel 14, the upper part of the grand channel 30 is close to the disc 17, therefore making this new brew assembly ultra short. To facilitating cleaning, the grand channel 30 can be made removable or made of two halves with one of the halves removable. Unlike the filter assemblies taught by the applicant in U.S. Pat. No. 5,638,740, Akkerman-Theunisse et al. in U.S. Pat. No. 6,119,582, Brouwer in EP 1092377 and Sara Lee/DE and Philips in Senseo® coffeemakers, which all require a first container for coffee pods or grounds and a second container for receiving the first container and/or for forming a buffer reservoir, this new brew assembly has only one container for the coffee pod and requires no second container. In addition, the ultra short height of this new brew assembly can either make the coffee maker more compact or allow the coffee maker to accept a taller cup below the sloped grand channel 30.

FIG. 6 shows another preferred embodiment of the present invention. Like device 21 of FIG. 4, the device 21 of FIG. 6 is connected to container 10 that is placed above a container 38 having a sloped bottom 63 and a dispensing spout 36. An extension cylinder 72 is connected to cylinder 23 and is sufficiently long to allow its lower end 86 to nearly contact bottom 63 of container 38 to form a narrow gap 44 having a smaller left gap 44b and a relatively larger right gap 44a. The channel enclosed by the cylinders 23 and 72, a reflector 29 below the channel and gap 44 forms the cyclone channel. A cyclone zone 32 is formed in the space defined by the reflector and the side wall of the cyclone channel according to the theory described earlier in FIG. 3.

To form the cyclone zone 32, gap 44 must have an appropriate size. Too large a gap size is not capable of confining the micro-droplets in the space defined by the reflector and the side wall of the cyclone channel and reduce multiple reflections of the micro-droplets, therefore making the cyclone zone difficult to form. Too small a gap size makes the supply of air drawed into the cyclone zone insufficient and may trap too much coffee drink in the cyclone zone, both of which will cause the cyclone zone to extinguish. In either case, little or no crema will be generated. Since the gap 44 has different size at different locations when the reflector 29 is sloped or curved rather than flat, for simplicity, an average gap size used to describe the gap size. It was found that for a coffee machine that can produce a maximum pressure of 3 bars and deliver about 4 oz of hot water extraction in 20 to 30 seconds through the orifice 22 of about 0.9 mm in diameter, the appropriate average gap size for forming a cyclone zone is about 0.3 to 5 mm, preferably 0.5 to 2 mm. It should be noted that the appropriate average gap size varies to a certain degree with the size of grand channel 30 and the slope of the bottom 63 besides the capability of the coffeemaker. Generally, the appropriate average gap size is smaller for steeper slopped bottom wall 63 and for larger grand channel 30.

It is appreciated when the hollow cylinder 72 is movably connected to cylinder 23, one may move it up or down to change the size of the gap 44 to adjust the amount of crema generated. It is also appreciated that there can be two dispensing spouts 36 for the container 38 located on each side of the gap 44 as found in filter holders of existing pump espresso machines. It is further appreciated that when the dispensing spouts are close to gap 44, the bottom 63 can be substantially flat and still allows the formation of cyclone zone 32.

FIG. 7 shows another preferred embodiment of the present invention. The device 21 is identical to that of FIG. 1 except it has no satellite channels. Without the satellite channel, the necessary amount of air required to maintain the cyclone zone 32 alive in the cyclone channel is obtained by drawing air in from the bottom end of the cyclone channel. The tilted orifice 22 facilitates the formation of the cyclone zone possibly by breaking the high-speed coffee jet into numerous micro-droplets upon reaching the interior surface of the cyclone channel and by causing multiple reflections of such micro-droplets by the interior surface before exiting the bottom of the cyclone channel.

The scope of the invention is obviously not restricted to the various preferred embodiments described by way of examples and depicted in the drawings, there being numerous changes, modifications, combinations, additions, and applications thereof imaginable within the purview of the claims.

What is claimed is:

1. A device for preparation of a coffee drink having a visually appealing crema layer with pressurized hot water comprising:

a container for receiving flavor-containing materials and allowing the flavor-containing materials to interact with pressurized hot water to produce a coffee drink under pressure;

an orifice for converting the coffee drink under pressure from said container into a coffee drink jet at sufficiently high speed;

a cyclone channel positioned below said orifice and adapted to interact with the coffee drink jet from said orifice to generate a cyclone zone during the process of preparing the coffee drink, said cyclone zone drawing air in from atmosphere to emulsify with the coffee drink within said cyclone zone and driving the resulting emulsion out of said cyclone zone as a result of the momentum of the coffee drink jet, said emulsion separating into a coffee drink layer and a visually appealing crema layer on top of the coffee drink upon being received in a receptacle; and wherein said cyclone channel comprises at least one protrusion member on the interior surface of said cyclone channel for facilitating the formation of said cyclone zone in said cyclone channel.

2. A device for preparation of a coffee drink having a visually appealing crema layer with pressurized hot water comprising:

a container for receiving flavor-containing materials and allowing the flavor-containing materials to interact with pressurized hot water to produce a coffee drink under pressure;

an orifice for converting the coffee drink under pressure from said container into a coffee drink jet at sufficiently high speed;

a cyclone channel positioned below said orifice and adapted to interact with the coffee drink jet from said orifice to generate a cyclone zone during the process of preparing the coffee drink, said cyclone zone drawing air in from atmosphere to emulsify with the coffee drink within said cyclone zone and driving the resulting emulsion out of said cyclone zone as a result of the momentum of the coffee drink jet, said emulsion separating into a coffee drink layer and a visually appealing crema layer on top of the coffee drink upon being received in a receptacle, said cyclone channel comprising a reflector located a predetermined distance below said orifice and adapted to cause the formation of said cyclone zone; and two gaps formed between said reflector and said cyclone channel and on the left and right sides of said reflector for allowing the emulsion in said cyclone zone to be driven out as two streams for subsequent dispensing into two cups.

3. A device for preparation of a coffee drink having a visually appealing crema layer with pressurized hot water comprising:

a container for receiving flavor-containing materials and allowing the flavor-containing materials to interact with pressurized hot water to produce a coffee drink under pressure;

an orifice for converting the coffee drink under pressure from said container into a coffee drink jet at sufficiently high speed;

a cyclone channel positioned below said orifice and adapted to interact with the coffee drink jet from said orifice to generate a cyclone zone during the process of preparing the coffee drink, said cyclone zone drawing air in from atmosphere to emulsify with the coffee drink within said cyclone zone and driving the resulting emulsion out of said cyclone zone as a result of the momentum of the coffee drink jet, said emulsion separating into a coffee drink layer and a visually appealing crema layer on top of the coffee drink upon being received in a receptacle, said cyclone channel comprising a reflector located a predetermined distance below said orifice and adapted to cause the formation of said cyclone zone; and a channel located adjacent to said cyclone zone, said channel being sufficiently sloped for conducting the emulsion from the gap between said cyclone channel and said reflector to a receptacle.

4. A device for preparation of a coffee drink having a visually appealing crema layer with pressurized hot water comprising:

a container for receiving flavor-containing materials and allowing the flavor-containing materials to interact with pressurized hot water to produce a coffee drink under pressure;

an orifice for converting the coffee drink under pressure from said container into a coffee drink jet at sufficiently high speed;

a cyclone channel positioned below said orifice and adapted to interact with the coffee drink jet from said orifice to generate a cyclone zone during the process of preparing the coffee drink, said cyclone zone drawing air in from atmosphere to emulsify with the coffee drink within said cyclone zone and driving the resulting emulsion out of said cyclone zone as a result of the momentum of the coffee drink jet, said emulsion separating into a coffee drink layer and a visually appealing crema layer on top of the coffee drink upon being received in a receptacle, said cyclone channel comprising a reflector located a predetermined distance below said orifice and adapted to cause the formation of said cyclone zone; and a gap between said reflector and cyclone channel adapted to allow air to be drawn into and emulsion to be driven out of said cyclone zone.

5. A device as defined in claim 4 wherein said gap has an average gap size of approximately 0.05 to 0.4 cm.

6. A device as defined in claim 4 wherein said reflector comprises at least one of a convex reflection surface, a flat reflection surface and a sloped reflection surface.

7. A device as claim 4 further comprising a sufficiently sloped surface adjacent to said gap for conducting the emulsion from said gap to a spout opening for dispensing into a receptacle.

8. A device for preparation of a coffee drink having a visually appealing crema layer with pressurized hot water comprising:

a container for receiving flavor-containing materials and allowing the flavor-containing materials to interact with pressurized hot water to produce a coffee drink under pressure;

an orifice for converting the coffee drink under pressure from said container into a coffee drink jet at sufficiently high speed;

a cyclone channel positioned below said orifice and adapted to interact with the coffee drink jet from said orifice to generate a cyclone zone during the process of preparing the coffee drink, said cyclone zone drawing air in from atmosphere to emulsify with the coffee drink within said cyclone zone and driving the resulting emulsion out of said cyclone zone as a result of the momentum of the coffee drink jet, said emulsion separating into a coffee drink layer and a visually appealing crema layer on top of the coffee drink upon being received in a receptacle, and at least one satellite channel positioned along at least part of said cyclone channel for providing communication between said cyclone channel and atmosphere.

9. A device as defined in claim 8 wherein said satellite channel has an upper end located a predetermined distance above the bottom of said cyclone channel, a lower end in communication with atmosphere and an elongated opening between said ends of said satellite channel to provide communication between said cyclone channel and satellite channel.

10. A device as defined in claim 8 wherein said satellite channel comprises a hydrophobic surface for preventing coffee drink from filling said satellite channel by capillary force.

11. A device for preparation of a coffee drink having a visually appealing crema layer with pressurized hot water comprising:

a container for receiving flavor-containing materials and allowing the flavor-containing materials to interact with pressurized hot water to produce a coffee drink under pressure;

an orifice for converting the coffee drink under pressure from said container into a coffee drink jet at sufficiently high speed;

a cyclone channel positioned below said orifice and adapted to interact with the coffee drink jet from said orifice to generate a cyclone zone during the process of preparing the coffee drink, said cyclone zone drawing air in from atmosphere to emulsify with the coffee drink within said cyclone zone and driving the resulting emulsion out of said cyclone zone as a result of the momentum of the coffee drink jet, said emulsion separating into a coffee drink layer and a visually appealing crema layer on top of the coffee drink upon being received in a receptacle; and a crema modulator to regulate crema generation, said modulator being adapted to move between a first position, in which it causes the coffee drink in said container to form the coffee drink jet and to inject into said cyclone channel via said orifice to form said cyclone zone, and a second position, in which it causes the coffee drink in said container to enter said cyclone channel in such a way that a proper cyclone zone can not be formed to generate crema for the coffee drink.

12. A device for preparation of a coffee drink having a visually appealing crema layer with pressurized hot water comprising:

a container for receiving flavor-containing materials and allowing the flavor-containing materials to interact with pressurized hot water to produce a coffee drink under pressure;

an orifice for converting the coffee drink under pressure from said container into a coffee drink jet at sufficiently high speed;

a cyclone channel positioned below said orifice and adapted to interact with the coffee drink jet from said orifice to generate a cyclone zone during the process of preparing the coffee drink, said cyclone zone drawing air in from atmosphere to emulsify with the coffee drink within said cyclone zone and driving the resulting emulsion out of said cyclone zone as a result of the momentum of the coffee drink jet, said emulsion separating into a coffee drink layer and a visually appealing crema layer on top of the coffee drink upon being received in a receptacle; and a crema modulator to regulate crema generation, said modulator being adapted to move between a first position, in which it makes air properly available to said cyclone zone, and a second position, in which it staves said cyclone zone of air, thereby preventing said cyclone zone from being formed.

13. A device for preparation of a coffee drink having a visually appealing crema layer with pressurized hot water comprising:

a container for receiving flavor-containing materials and for allowing the flavor-containing materials to interact with pressurized hot water to produce a coffee drink;

an orifice for converting the coffee drink from said container into a coffee drink jet;

a coffee drink passageway positioned below said orifice, said passageway having an upper end for receiving the coffee drink jet from said orifice, a channel comprising a crema surface located directly below said upper end and adapted to interact with the coffee drink jet from said upper end to generate crema thereon, and a sufficiently sloped bottom surface located adjacent to said crema surface and adapted to cause the coffee drink and crema generated at said crema surface to flow under gravity along said channel, and a lower end for discharging the coffee drink and crema from said sufficiently sloped bottom surface of said grand channel into a receptacle for consumption, the crema received in the receptacle tending to rise to form a visually appealing crema layer on top of the coffee drink; and means for introducing air to the space above said crema surface in said channel for the generation of said crema.

14. A device as defined in claim 13 wherein said means comprises an arrangement for a substantially continuous air space to be formed above the crema and coffee drink above said sufficiently sloped bottom surface of said channel.

15. A device as defined in claim 13 wherein said container comprises a filter, a supply of flavor-containing materials above said filter and a bottom for supporting said filter and directing coffee drink from said filter to said orifice.

16. A device as defined in claim 13 wherein said orifice and said channel are adapted to cause crema to form on said crema surface when the pressure of the hot water delivered into said container is lower than approximately three bars.

17. A device for preparation of a coffee drink having a visually appealing crema layer with pressurized hot water comprising:

a container for receiving flavor-containing materials and allowing the flavor-containing materials to interact with pressurized hot water to produce a coffee drink under pressure;

an orifice for converting the coffee drink in container under pressure into a coffee drink jet at sufficiently high speed;

a chamber positioned below said orifice for receiving the coffee drink jet from said orifice; and a crema modulator for controlling the amount of crema to be generated for the coffee drink, said modulator comprising a fluid control member, a handle for a user to move said fluid control member and an engagement member for said fluid control member, said fluid control member being adapted to move between a first position, in which it causes crema generation by causing at least one of the two actions of directing the coffee drink in said container to said orifice to form the coffee drink jet to inject and making air properly available to the coffee drink jet, and a second position, in which it prevents crema generation by causing at least one of the two actions of directing at least part of the coffee drink in said container to another opening and making air not available to the coffee drink jet, thereby enabling a user to select the amount of crema to be generated.

18. A device as defined in claim 17 wherein said fluid control member further comprises a plate member in which said orifice is formed, said plate member being adapted to form a seal to said container when said fluid control member is in said first position and to form said another opening when said fluid control member is in said second position.

19. A device as defined in claim 17 wherein said fluid control member comprises a hollow member for enclosing the coffee drink from said orifice, said hollow member being adapted to to make air properly available to the coffee drink jet at said first position and to starve the coffee drink jet of air at said second position.

20. A device for preparation of a drink having a visually appealing crema layer comprising:

a chamber for receiving a drink;

an orifice for converting the drink in said chamber into a drink jet; and a second chamber positioned below said orifice and adapted to interact with the jet from said orifice to generate a cyclone zone during the process of preparing the drink, said cyclone zone drawing air in from atmosphere to emulsify with the drink within said cyclone zone and driving the resulting emulsion out of said cyclone zone as a result of the momentum of the drink jet, said emulsion separating into a drink layer and a visually appealing crema layer on top of the drink upon being received in a receptacle; and wherein said second chamber comprises at least one protrusion member on the interior surface of said second chamber below said orifice for facilitating the formation of said cyclone zone in said second chamber.

21. A device for preparation of a drink having a visually appealing crema layer comprising:

a chamber for receiving a drink;

an orifice for converting the drink in said chamber into a drink jet; and a cyclone channel positioned below said orifice and adapted to interact with the jet from said orifice to generate a cyclone zone during the process of preparing the drink, said cyclone zone drawing air in from atmosphere to emulsify with the drink within said cyclone zone and driving the resulting emulsion out of said cyclone zone as a result of the momentum of the drink jet, said emulsion separating into a drink layer and a visually appealing crema layer on top of the drink upon being received in a receptacle, wherein said second chamber comprises a reflector located a predetermined distance below said orifice and adapted to cause the formation of said cyclone zone; and a gap between said reflector and the bottom end of said cyclone channel for allowing air to be drawn into and the emulsion to be driven out of said cyclone zone.

22. A device as defined in claim 21 wherein said gap has an average size of approximately 0.05 to 0.4 cm.

23. A device for preparation of a drink having a visually appealing crema layer comprising:

a chamber for receiving a drink;

an orifice for converting the drink in said chamber into a drink jet; and a cyclone channel positioned below said orifice and adapted to interact with the jet from said orifice to generate a cyclone zone during the process of preparing the drink, said cyclone zone drawing air in from atmosphere to emulsify with the drink within said cyclone zone and driving the resulting emulsion out of said cyclone zone as a result of the momentum of the drink jet, said emulsion separating into a drink layer and a visually appealing crema layer on top of the drink upon being received in a receptacle; and at least one satellite channel along said cyclone channel, said satellite channel having an upper end located a predetermined distance above the bottom of said cyclone channel, a lower end in communication with atmosphere and an elongated opening between said ends of said satellite channel to provide communication between said cyclone channel and satellite channel.

* * * * *